US009063743B2

(12) United States Patent
Spiess et al.

(10) Patent No.: US 9,063,743 B2
(45) Date of Patent: Jun. 23, 2015

(54) MODEL-BASED PROGRAMMING, CONFIGURATION, AND INTEGRATION OF NETWORKED EMBEDDED DEVICES

(75) Inventors: Patrik Spiess, Karlsruhe (DE); Stamatis Karnouskos, Karlssruhe (DE); Stephan Haller, Hombrechtikon (CH); Nina Oertel, Mannheim (DE)

(73) Assignee: SAP SE, Walldorf, DE (US)

( * ) Notice: Subject to any disclaimer, the term of this patent is extended or adjusted under 35 U.S.C. 154(b) by 1028 days.

(21) Appl. No.: 12/952,517

(22) Filed: Nov. 23, 2010

(65) Prior Publication Data

US 2012/0131561 A1 May 24, 2012

(51) Int. Cl.
- *G06F 9/44* (2006.01)
- *G06F 11/30* (2006.01)
- *G06F 9/50* (2006.01)
- *H04W 4/00* (2009.01)
- *G06F 9/45* (2006.01)
- *G06F 11/36* (2006.01)
- *H04L 29/08* (2006.01)

(52) U.S. Cl.
CPC . *G06F 8/35* (2013.01); *G06F 8/443* (2013.01); *G06F 11/3624* (2013.01); *H04L 29/0872* (2013.01); *G06F 11/30* (2013.01); *G06F 8/447* (2013.01); *G06F 9/5038* (2013.01); *H04W 4/00* (2013.01); *H04W 4/005* (2013.01); *H04L 67/12* (2013.01)

(58) Field of Classification Search
None
See application file for complete search history.

(56) References Cited

U.S. PATENT DOCUMENTS

| 6,199,195 | B1 * | 3/2001 | Goodwin et al. | 717/104 |
|---|---|---|---|---|
| 6,226,788 | B1 * | 5/2001 | Schoening et al. | 717/107 |
| 6,442,748 | B1 * | 8/2002 | Bowman-Amuah | 717/108 |
| 6,463,582 | B1 * | 10/2002 | Lethin et al. | 717/158 |
| 7,533,365 | B1 * | 5/2009 | Hogstrom et al. | 717/105 |
| 8,156,481 | B1 * | 4/2012 | Koh et al. | 717/151 |

(Continued)

OTHER PUBLICATIONS

Amol Bakshi, Viktor K. Prasanna; Jim Reich, and Daniel Larner, "The Abstract Task Graph: A Methodology for Architecture-Independent Programming of Networked Sensor Systems." In EESR '05: Proceedings of the 2005 Workshop on End-to-End, Sense-and-Respond Systems, Applications and Services, pp. 19-24, Berkeley, CA, USA, 2005. USENIX Association.

(Continued)

*Primary Examiner* — Lewis A Bullock, Jr.
*Assistant Examiner* — Tina Huynh
(74) *Attorney, Agent, or Firm* — Fountainhead Law Group PC

(57) ABSTRACT

Embodiments of the invention relate to programming, configuring, and integrating networked embedded devices with other applications. Particular embodiments include an architecture having an application model layer that integrates the networked embedded devices with business application systems, by allowing the devices to be expressed as part of a business application concept. In certain embodiments, an intermediate device programming layer provides a network-centric programming abstraction, relieving the programmer of the details of low-level, node-centric programming. Finally, a self-optimizing run-time system layer adapts to the specific conditions in the deployed network embedded devices, by optimizing e.g. communication patterns and resource consumption based upon input from the higher layer (s). Embodiments may facilitate integration of networked embedded devices with the back ends of business applications, and may provide a unified extensible programming framework simplifying development of applications for network embedded devices.

6 Claims, 10 Drawing Sheets

(56) References Cited

U.S. PATENT DOCUMENTS

| | | | |
|---|---|---|---|
| 2003/0079214 A1* | 4/2003 | Ghobrial et al. | 717/158 |
| 2004/0143825 A1* | 7/2004 | Hicks | 717/148 |
| 2006/0223546 A1* | 10/2006 | Claussen | 455/456.1 |
| 2007/0168925 A1* | 7/2007 | Bornhoevd et al. | 717/104 |
| 2007/0234301 A1* | 10/2007 | Garvey et al. | 717/124 |
| 2007/0282746 A1* | 12/2007 | Anke et al. | 705/51 |
| 2007/0283001 A1* | 12/2007 | Spiess et al. | 709/224 |
| 2008/0010635 A1* | 1/2008 | O'Brien et al. | 717/160 |
| 2008/0168433 A1* | 7/2008 | Arnold et al. | 717/158 |
| 2008/0253327 A1* | 10/2008 | Kohvakka et al. | 370/330 |
| 2008/0306798 A1* | 12/2008 | Anke et al. | 705/8 |
| 2009/0097397 A1* | 4/2009 | Moreira Sa de Souza | 370/216 |
| 2009/0113232 A1* | 4/2009 | Park et al. | 714/2 |
| 2009/0125878 A1* | 5/2009 | Cullum et al. | 717/106 |
| 2009/0222921 A1* | 9/2009 | Mukhopadhyay et al. | 726/23 |
| 2009/0327996 A1 | 12/2009 | Siegemund | |
| 2010/0011340 A1* | 1/2010 | Pandey | 717/107 |
| 2010/0180255 A1* | 7/2010 | Chung et al. | 717/110 |
| 2010/0269112 A1 | 10/2010 | Lopez-Ramos et al. | |
| 2011/0035735 A1* | 2/2011 | Kramp et al. | 717/148 |
| 2011/0265064 A1* | 10/2011 | Hadar et al. | 717/121 |

OTHER PUBLICATIONS

Christian Frank and Kay Roemer, "Algorithms for Generic Role Assignment in Wireless Sensor Networks." In SnSys. pp. 230-242, Nov. 2-4, 2005, San Diego, California.

R. Gummadi, O. Gnawali, and R. Govindan, "Macro-Programming Wireless Sensor Networks Using Kairos." In DCOSS, pp. 126-140, 2005.

S. Karnouskos, D. Savio, P. Spiess, D. Guinard, V. Trifa, and O. Baecker, Real-World Service Interaction with Enterprise Systems in Dynamic Manufacturing Environments. In L. Benyoucef and B. Grabot, editors, Artificial Intelligence techniques for Networked Manufacturing Enterprises Management, No. ISBN 978-1-84996-118-9. Springer, 2010 (in press).

Samuel. R. Madden, Michael J. Franklin and Joseph M. Hellerstein, "TinyDB: An Acuisitional Query Processing System for Sensor Networks." ACM Transactions on Database Systems, vol. 30, No. 1, Mar. 2005. pp. 122-173.

L. Mottola and G.P. Picco, "Programming Wireless Sensor Networks with Logical Neighborhoods." In InterSense, p. 8, 2006.

R. Newton, G. Morrisett, and Matt Welsh, "The Regiment Macroprogramming System." In IPSN '07: Proceedings of the 6th International Conference on Information Processing in Sensor Networks, pp. 489-498, New York, 2007.

P. Spiess and S. Karnouskos, "Maximizing the Business Value of Networked Embedded Systems through Process-Level Integration into Enterprise Software." In Second International Conference on Pervasive Computing and Applications (ICPCA 2007), Birmingham, UK, pp. 536-541, Jul. 26-27, 2007.

Mohammad Mostafizur Rahman Mozumdar, et al., "HILAC: A Framework for hardware in the Loop Simulation and Multi-Platform Automatic Code Generation of WSN Applications," 2010 IEEE, Jul. 7, 2010, pp. 88-97, Electrical Engineering & Computer Sciences.

Aleksander Pruszkowski, et al., "From C to VM-Targeted Executables: Techniques for Heterogeneous Sensor/Actuator Networks," 2012 IEEE, Jul. 8, 2010, pp. 61-66, Institute of Telecommunications.

Bartolome Rubio, et al., "Programming Approaches and Challenges for Wireless Sensor Networks," 2007 IEEE, Aug. 1, 2007, pp. 36-36, Second International Conference on Systems and Networks Communications.

Wouter Horre, et al., "A Survey of Middleware for Wireless Sensor Networks," Aug. 31, 2007, pp. 1-28, Report CW 498.

Extended European Search Report (from a corresponding foreign application) EP 11009149, mailed Mar. 28, 2012.

* cited by examiner

MODEL-BASED PROGRAMMING, CONFIGURATION, AND INTEGRATION OF NETWORKED EMBEDDED DEVICES

BACKGROUND

Embodiments according to the present invention relate to the programming, configuration, and integration of networked embedded devices with other applications.

Unless otherwise indicated herein, the approaches described in this section are not prior art to the claims in this application and are not admitted to be prior art by inclusion in this section.

Networked embedded devices are difficult to program. For example, programming is typically focused on individual nodes (such as sensors) and proprietary customized interfaces, requiring programmers to concentrate on low-level details rather than upon high-level objectives.

Many early sensor network deployments involved only sensors, and realized relatively simple application goals, such as reporting aggregated data to a base station. However as sensor networks are integrated into more sophisticated systems of networked cooperating objects, the processing tends to involve control loops where the monitoring facilities are complemented by the ability to control the environment utilizing an actuator automatically, in real-time, and in a decentralized fashion.

The ability to monitor and control complex processes may be important for the integration of networked embedded devices such as Wireless Sensor Networks WSNs, into systems of cooperating objects, and beyond the niche of very specific use cases e.g. environmental monitoring. Examples include but are not limited to monitoring and optimization of energy usage, traffic management, manufacturing processes, supply chain management, logistics etc.

As such networks of programmable embedded devices become more complex, rapid application development is gaining significance. To allow widespread adoption of these networks, they may be integrated with business applications. Incorporated by reference in its entirety herein for all purposes is Karnouskos et al, "Real world service interaction with enterprise systems in dynamic manufacturing environments", *Artificial Intelligence Techniques for Networked Manufacturing Enterprises Management*, Benyoucef and Grabot Eds., Springer, (2010) ISBN 978-1-84996-118-9.

As used herein, the term 'business applications' refers generally to software that supports enterprises in achieving their goals. Examples of such goals include tracking business assets such as inventory or goods, and providing a mechanism to follow monetary flows within a company.

Business applications are typically executed by business information systems, such as Enterprise Resourse Planning ERP, Supply Chain Management SCM or Customer Relationship Management CRM systems. For many business applications, sensor networks may be closely integrated with the back-end computing and communication infrastructures so that a complete business process is executed partly in the back-end infrastructure, and partly in a sensor network close to the phenomenon of interest. Incorporated by reference in its entirety herein for all purposes is Spiess and Karnouskos, "Maximizing the business value of networked embedded systems through process level integration into enterprise software", *Second International Conference on Pervasive Computing and Applications* (ICPCA 2007), Birmingham, United Kingdom, pp. 536-541 (2007).

Current efforts may not support rapid and wide market adoption of this technology. For example, only relatively few deployments of real world WSN applications exist, and those deployments tend to be noncommercial in nature. Several recent surveys such as the OnWorld report on Wireless Sensor Networks, and the CONET road-map, have identified the lack of ease of use as a major barrier for the adoption of WSN.

Today it may be difficult to realize network embedded device applications. Current programming platforms are low-level, typically at the operating system level. The programmer must therefore concentrate on details distant from the application logic, such as communication protocols, or power management.

These issues may be exacerbated in the context of WSNs, due to tension between the desired application requirements and the constraints of WSNs. In particular, requirements such as high reliability or long lifetime are difficult to realize in the highly dynamic, unreliable, and resource-constrained environment that characterizes WSNs.

Such an atmosphere generates a lack of visibility. For example, it is hard to investigate the performance or correctness of WSN processes, since they are typically hard-coded from scratch every time.

The research community has attempted to address these concepts, but has not yet solved at least two fundamental issues: unification and integration. FIG. 1 depicts this in a schematic manner, with the goal of integration 100 representing linkage of WSNs 102 with business processes 104, and the goal of unification 106 addressing a comprehensive programming framework for the WSNs.

As used herein, unification refers to a unified, comprehensive programming framework for network embedded devices such as WSNs. Existing proposals typically focus on one specific problem. One instance is how to specify the applicative role a node should take based on its context. For example, incorporated by reference herein for all purposes is Frank and Römer, "Algorithms for generic role assignment in wireless sensor networks", *SenSys*, pp. 230-242, (2005).

Another instance of the narrowness of current approaches, is a focus on how to specify the subset of nodes that should receive a sensing or actuating command. For example, incorporated by reference herein for all purposes is Mottola and Picco, "Programming wireless sensor networks with logical neighborhoods", *InterSense*, p. 8 (2006).

Still another instance of narrow focus, is how to efficiently query efficiently the WSN at large. For example, incorporated by reference in its entirety herein for all purposes is Madden et al., "Tinydb: an acquisitional query processing system for sensor networks", *ACM Trans. Database Syst.*, 30(1):122-173 (2005).

Even where proposals are more comprehensive (as in the case of Kairos), they typically assume a homogeneous, sense-only scenario. For example, incorporated by reference in its entirety herein for all purposes is Gummadi et al., "Macroprogramming wireless sensor networks using airos", *DCOSS*, pp. 126-140 (2005).

Targeting business-oriented scenarios requires a broader approach, where the various core functionalities for development are harmonized in a single programming interface. As described in detail below, this can be achieved by integrating abstractions and mechanisms that until now have been considered in isolation.

At the same time, different application domains may require different functionality and a "one-size-fits-all" approach can be reductive (providing too few features), or inefficient (providing too many unused features).

As used herein, integration refers to strong cooperation of the business backend with network embedded devices such as WSNs. Conventional programming approaches typically consider the WSN as a stand-alone system. As such, the integration between the WSN and the backend infrastructure of business processes is left to the application developers.

Such integration requires considerable effort. From a technical standpoint, it requires significant expertise spawning from information systems on the traditional wired networks involving the back-end, down to low-level operating systems details on the tiny WSN devices. Moreover, these two sets of technologies (WSN and business applications) are typically designed to satisfy different goals, making the integration even harder.

Currently, industry may be reluctant to adopt WSN technology because of three factors: (i) the integration effort with existing business systems is too large, (ii) the difficulty of management of sensor network applications, and (iii) the difficulty involved in the development of large-scale, real-world applications.

Embodiments according to the present invention addresses these and other issues, with systems and methods employing a holistic approach that permits application developers to think at high levels of abstraction (that of business processes), but the constructs used are effectively implemented in the challenging reality of WSNs.

SUMMARY

Embodiments of the invention relate to programming, configuring, and integrating networked embedded devices with other applications. Certain embodiments may include an architecture having an application model layer that integrates the networked embedded devices with business application systems, by allowing the devices to be expressed as part of a business application concept. In certain embodiments, an intermediate device programming layer provides a network-centric programming abstraction, thereby relieving the programmer of the details of low-level, node-centric programming Finally, a self-optimizing run-time system layer adapts to the specific conditions in the deployed network embedded devices, by optimizing e.g. communication patterns and resource consumption based upon input from the higher layer(s). Embodiments of the invention may facilitate integration of networked embedded devices with the back ends of business applications, and provide a unified extensible programming framework simplifying development of applications for network embedded devices.

An embodiment of a computer-implemented method according to the present invention comprises, providing a network model of network embedded devices, creating a process model including an artifact restricted by a functionality indicated by the network model, providing the process model as an input to a compiler to produce first executable code including a communication primitive, the first executable code recognized by an operating system of the network embedded device, and to produce a second executable code including the communication primitive, the second executable code recognized by a business software application, and controlling operation of the network embedded devices based upon the first executable code.

In certain embodiments an output from the compiler comprises a plurality of abstractions of a high level device programming language, and the method further comprises providing the plurality of abstractions to a second compiler to produce the first executable code.

In certain embodiments the second compiler references the network model to produce the first executable code.

In certain embodiments the functionality comprises runtime functionality provided to the process model in the form of raw results and node-level monitoring information.

In certain embodiments the functionality comprises runtime functionality provided to the process model in the form of application results and profiling information.

In certain embodiments the network embedded devices comprise a wireless sensor network.

An embodiment of a non-transitory computer readable storage medium according to present invention embodies a computer program for performing a method comprising, providing a network model of network embedded devices, creating a process model including an artifact restricted by a functionality indicated by the network model, providing the process model as an input to a compiler to produce first executable code including a communication primitive, the first executable code recognized by an operating system of the network embedded devices, and to produce a second executable code including the communication primitive, the second executable code recognized by a business software application, controlling operation of the network embedded devices based upon the first executable code.

In certain embodiments an output from the compiler comprises a plurality of abstractions of a high level device programming language, and the method further comprises providing the plurality of abstractions to a second compiler to produce the first executable code.

In certain embodiments the second compiler references the network model to produce the first executable code.

In certain embodiments the functionality comprises runtime functionality provided to the process model in the form of raw results and node-level monitoring information.

In certain embodiments the functionality comprises runtime functionality provided to the process model in the form of application results and profiling information.

In certain embodiments the network of network embedded devices comprises a wireless sensor network.

An embodiment of a computer system according to the present invention comprises one or more processors, and a software program executable on said computer system and configured to provide a network model of network embedded devices, create a process model including an artifact restricted by a functionality indicated by the network model, provide the process model as an input to a compiler to produce first executable code including a communication primitive, the first executable code recognized by an operating system of the network embedded devices, and to produce a second executable code including the communication primitive, the second executable code recognized by the business software application, and controlling operation of the network embedded devices based upon the first executable code.

The following detailed description and accompanying drawings provide a better understanding of the nature and advantages of the present invention.

DETAILED DESCRIPTION

Described herein are techniques for programming, configuring, and integrating networked embedded devices such as wireless sensor networks (WSNs), with other applications.

The apparatuses, methods, and techniques described below may be implemented as a computer program (software) executing on one or more computers. The computer program may further be stored on a computer readable medium (e.g., a non-transitory computer readable storage medium), which may be accessible over the network. The computer readable medium may include instructions for performing the processes described below.

In the following description, for purposes of explanation, examples and specific details are set forth in order to provide a thorough understanding of various embodiments of the present invention. It will be evident, however, to one skilled in the art that the present invention as defined by the claims may include some or all of the features in these examples alone or in combination with other features described below, and may further include modifications and equivalents of the features and concepts described herein.

Certain embodiments according to the present invention seek to integrate network embedded device programming with business processes. This lowers the barrier of adoption for commercial applications of networked embedded devices, by improving their ease of use by solving the problems of unification and integration.

In the following discussion, particular emphasis is given to network embedded devices in the form of wireless sensor networks. However, the present invention is not limited to these devices, and could be applied to other forms of network embedded devices, including but not limited to routers, vending machines, Radio Frequency Identification (RFID) readers, process components, and automation components.

Figure 2A:
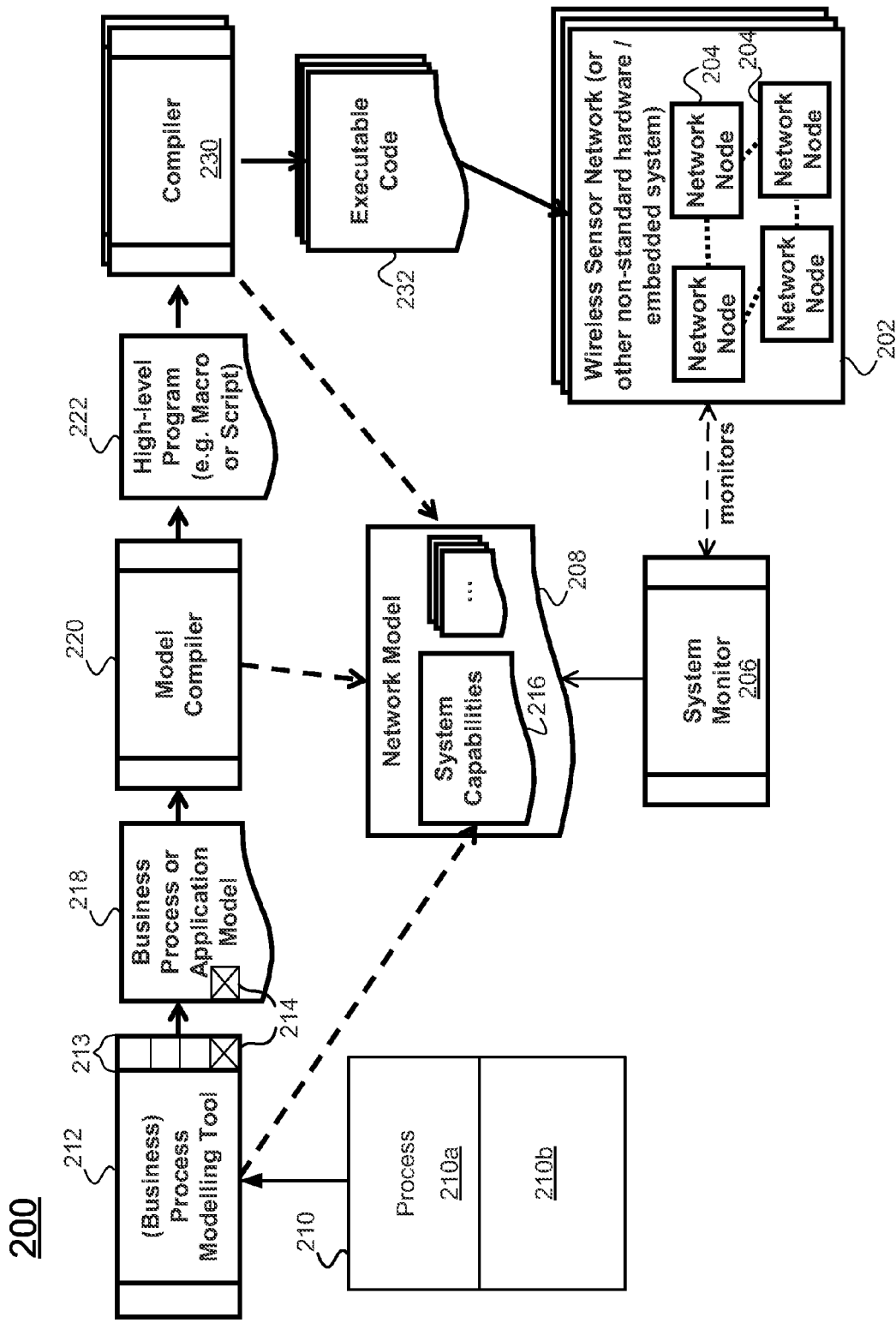
FIG. 2A shows a simplified block diagram illustrating a design phase of an embodiment of the present invention.

FIG. 2A is a simplified block diagram showing an embodiment of the architecture 200 in the design-time phase. The architecture comprises a deployed and active network 202 of sensor nodes 204 (or any other embedded hardware with specific functionality).

An optional system monitor 206 component monitors the state of the network 202, and dynamically discovers the individual nodes 204 and their capabilities. This information comprises the network model 208, a data structure that is created by the system monitor 206.

This step is optional, because a network model could alternatively be created manually. For instance, the network model 208 could be created before the sensor network is actually deployed, based upon the expected configuration of that network. In such an embodiment, software development is already done in parallel in this early stage.

A human user such as a domain expert, would create a process 210. One subset 210a of the tasks of this process, is intended to be executed by a processor that is running a business software application. Another subset 210b of the tasks of this process 201, is intended to be executed by the nodes of the sensor network.

A modeling tool 212 is used to model the process in terms of domains of a business software application. Accordingly, with reference to the network model 208 (shown by the dashed line), a modeling tool 212 presents only artifacts 214 expressing functionality that is actually available in the sensor network 200. This functionality information is available from the system capabilities part 216 of the network model 208.

As used herein, the term artifact refers to "modeling artifacts" that are the building blocks for the model. When modeling a process, the user typically has a "palette" of modeling artifacts which he or she uses (e.g. by dragging and dropping), to create the elements of the model. According to certain embodiments of the present invention, the modeling software hides elements on the "palette" representing functionality not offered by the concrete sensor network deployment 202.

A result of the modeling of the process 210 by the tool 212, is the application model 218. This application model 218 references artifacts that are available in the sensor network.

An example of this relates to the process of monitoring or regulating an environment in a building. This scenario is for demonstration purposes of understanding how the proposed concept could be applied. A maintenance worker may need to be sent to a location in the building if a certain $CO_2$ level is exceeded. A subset of this process is to be executed by the sensor network (determining $CO_2$ level), and a subset of this process is to be executed by the business software application (contacting outside parties such as a maintenance crew).

The process task of monitoring that phenomenon and reporting it, is expressed in the modeling tool 212. According to embodiments of the present invention, "$CO_2$ monitoring and reporting of threshold excess" is available as a functionality from the palette 213 of modeling artifacts 214 offered by model 218, only if the network 200 is equipped with $CO_2$ sensors, and if the network is able to compare measured value to a given threshold and to report excess.

The application model 218 is compiled by the model compiler 220 into a high-level program 222. This high-level program may be in the form of a Macro or a Script.

This high-level program 222 uses a high-level system interface (e.g. a high-level API) that is independent of the particular operating system of the embedded network devices. As shown in the dashed line, the model compiler 220 again references the network model to determine the high-level interface that is supported by the sensor network.

According to certain embodiments, a plurality of different types of network embedded devices may be present, each having a different high-level program format. Thus the model compiler in some embodiments would be able to create a high-level program in any of those formats.

For various types of sensor networks (or other systems of embedded software), there exists a second compiler 230 that compiles the high-level program into executable code 232 that is actually recognized by the operating system of the embedded network devices. The executable code 232 could be in the form of machine code, or an intermediate language that is interpreted by a run-time environment on the nodes of the network.

As shown by the dashed line, the second compiler 230 could again reference the network model containing information about the network's topology (e.g. the nature and quality of the communication links between the nodes). This reference could be to decide which functionality to put onto which part of the network.

The code is then injected in the network, for example by pushing or pulling. The senor nodes execute the code according to the business process software, in the manner described during the run-time phase depicted in FIG. 2B.

Specifically, in the execution phase of the business process, it is assumed that connection information is put into the resulting executable code 232. This connection information is able to interact with the business application software that is running.

Physically, the sensor nodes 204 communicate with the business application software 250 during runtime. Logically, the executable code in the network nodes interacts with the application model 218, that is executed by the application engine 250 within the business process runtime.

Figure 2B:
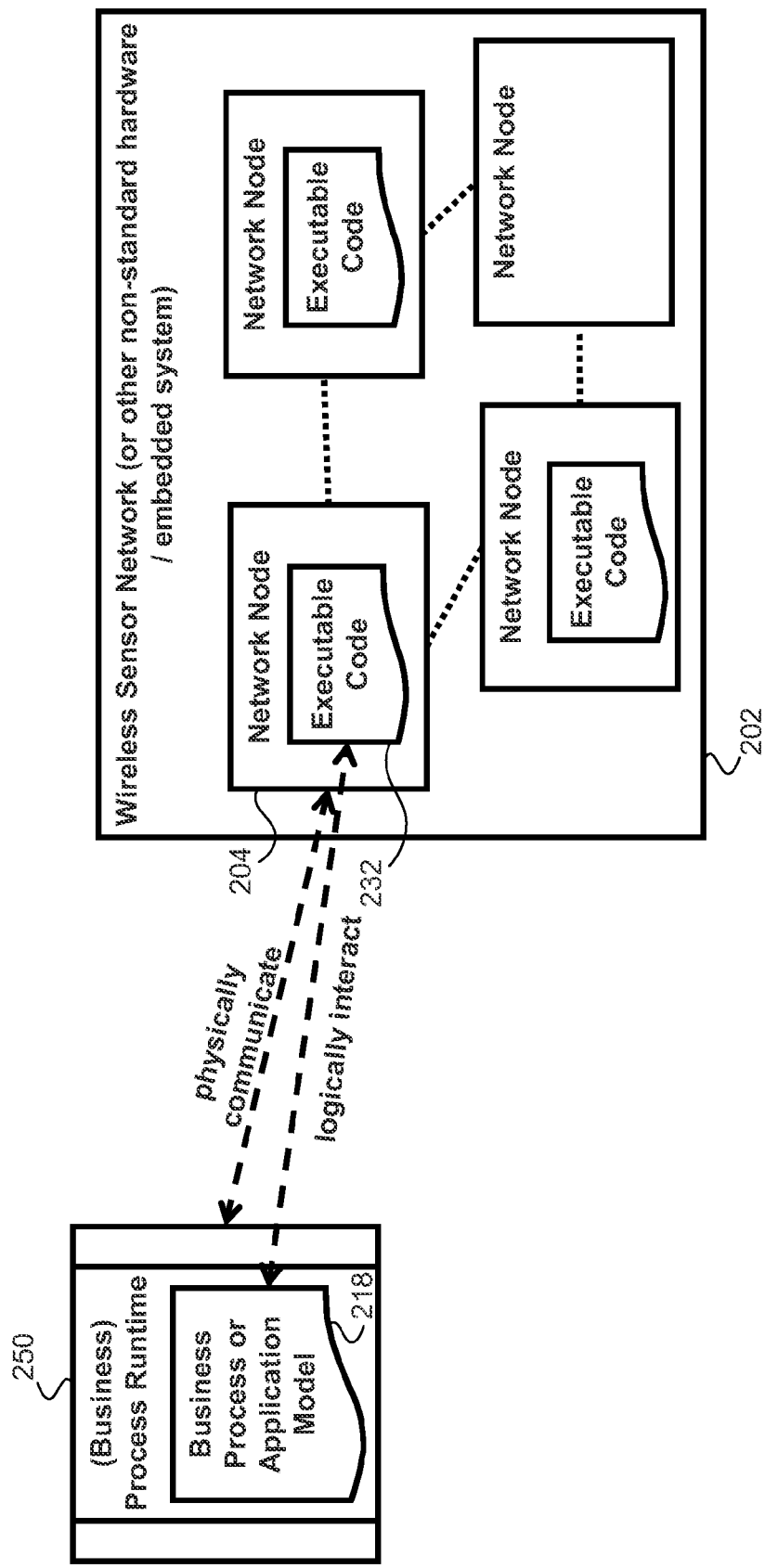
FIG. 2B shows a simplified block diagram illustrating a runtime phase of an embodiment of the present invention.
Figure 2C:
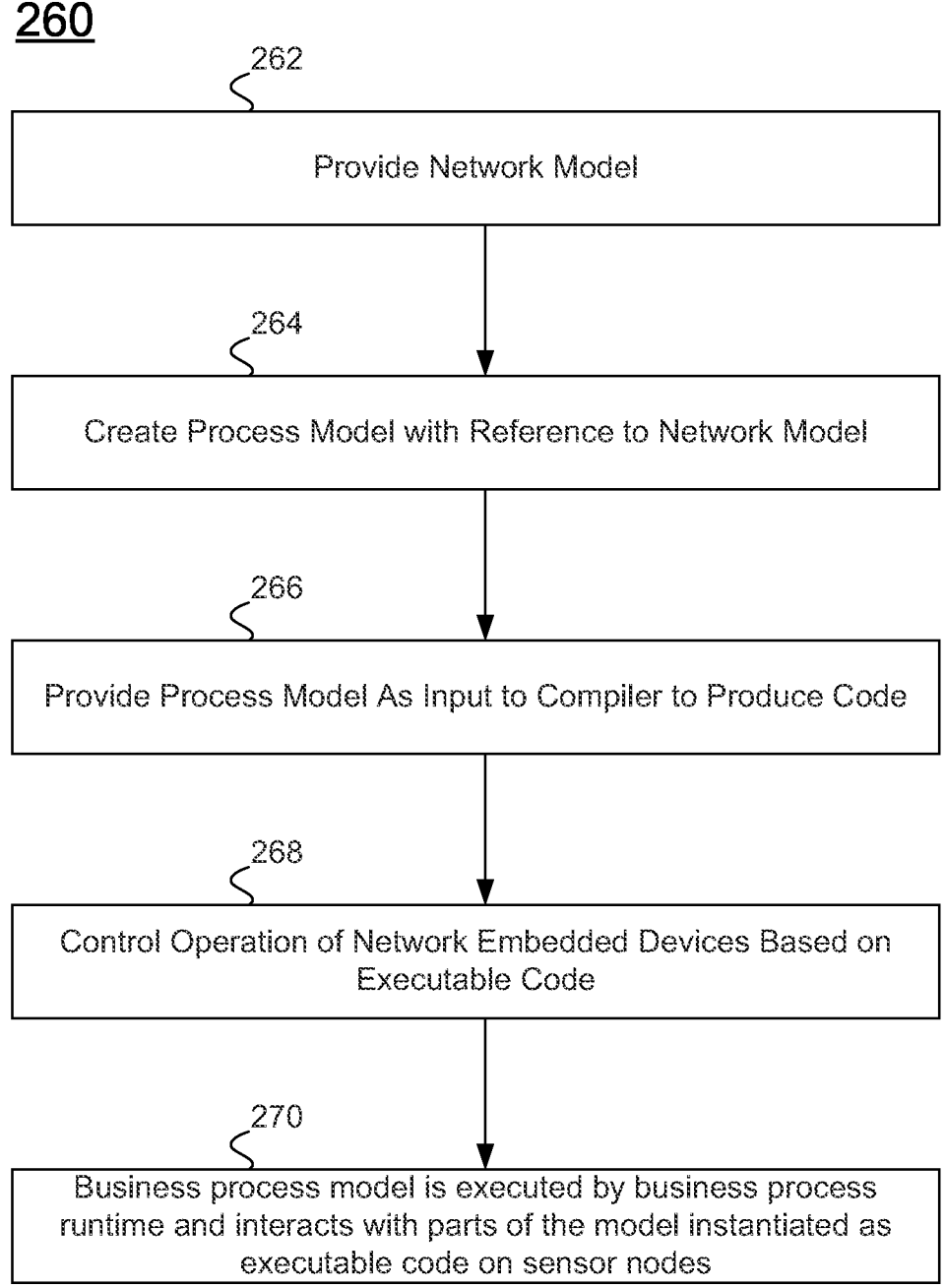
FIG. 2C is a simplified block diagram showing steps of a method according to an embodiment of the present invention.

FIG. 2C is a simplified block diagram showing steps of a method 260 according to an embodiment of the present invention. In a first step 262, a network model of network embedded devices is provided. In a second step 264, a process model is created including an artifact restricted by a functionality indicated by the network model.

In a third step 266, the process model is provided as an input to a compiler to produce first executable code including a communication primitive, the first executable code and recognized by an operating system of the network embedded device, and to produce second executable code including the communication primitive, and recognized by the business software application. According to certain embodiments the method step 266 may be performed in two stages, with a first compiler generating a high-level code from the process mode, and a second compiler generating executable code from the high-level code.

In step 268, the executable code is injected into the network by pushing or pulling, to control operation of the network embedded devices.

Step 270 shows the run-time phase, for example as is described in FIG. 2B. Here, the business process model is executed by a business process runtime and interacts and communicates with the parts of the model that are instantiated as executable code fragments on the sensor nodes.

Figure 3A:
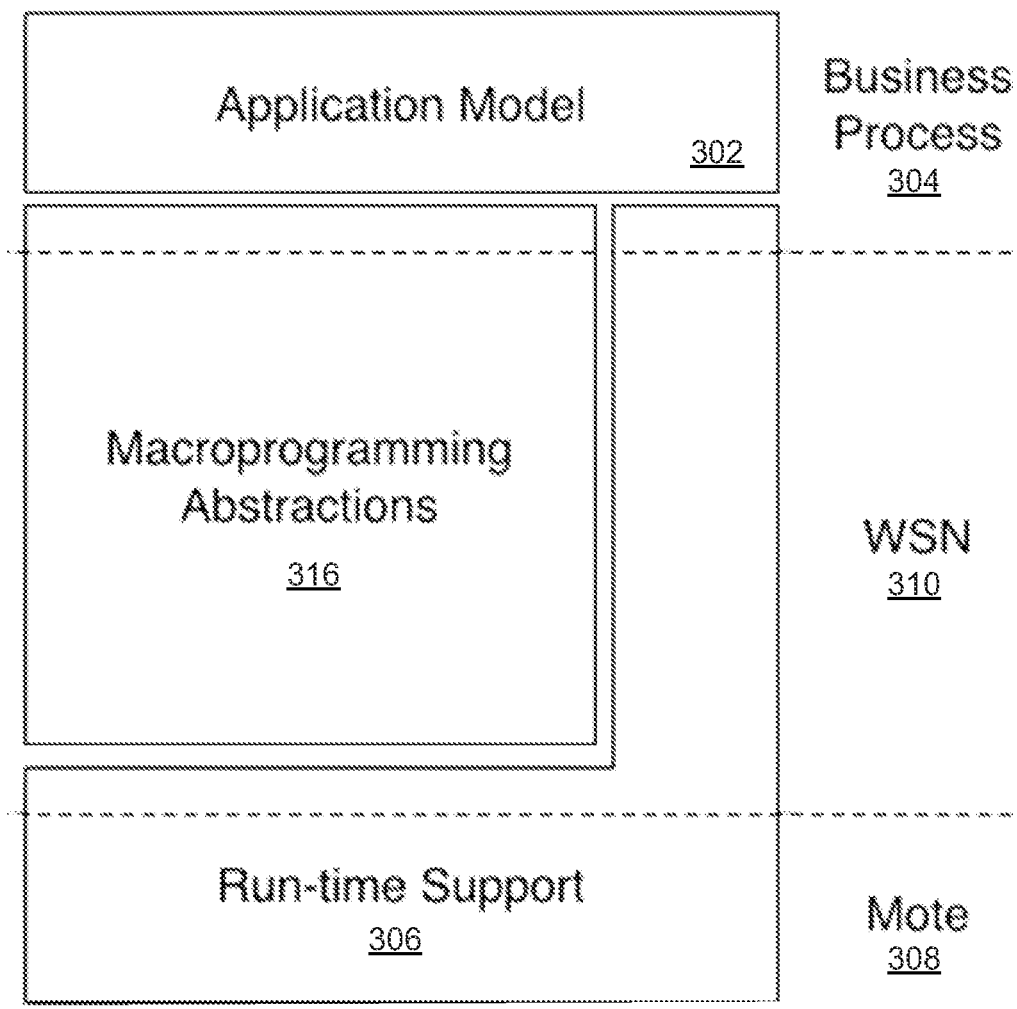
FIG. 3A depicts a simplified high-level view of one embodiment of an architecture in accordance with the present invention.

FIG. 3A shows a high-level view of one embodiment of an architecture 300 according to the present invention. This architecture employs three levels, and is focused upon integrating a single type of network embedded device (a WSN). This architecture achieves unification and integration, from an application model 302 described in terms of a business process 304, to run-time support 306 executing on nodes 308 of a WSN 310.

The application model 302 is the topmost layer. The application model of a WSN application is expressed in terms of a business process. This layer is the architecture's interface to the application developer, offering tools to develop a declarative model of the desired application behavior. To the extent possible, these can be standard Business Process Management (BPM) tools and languages, which may be extended or adapted to manage specifics of networked embedded devices such as WSNs. Examples of such standard BPM tools include but are not limited to BPEL (including OASIS WSBPEL), and BPMN (including NetWeaver BPM available from SAP AG of Walldorf Germany).

The macroprogramming abstractions 316 comprise the middle layer of the architecture. It is a programming framework that eases the development of WSN applications. Various application scenarios may use a rich set of programming abstractions whose focus can be individual nodes, a group of nodes, or the network as a whole.

This layer 316 essentially abstracts the low-level details handled by the run-time, by defining a comprehensive set of commonly-used programming abstractions. Moreover, this macroprogramming layer 316 can be used by itself, and may be more extensive and powerful than what is provided in systems such as TinyDB, ATaG, or Regiment, particularly for application execution monitoring. TinyDB is discussed by Madden et al. cited above. ATaG and Regiment are described respectively by Bakshi et al, "The abstract task graph: a methodology for architecture independent programming of networked sensor systems", *EESR '05: Proceedings of the 2005 workshop on End-to-end, sense-and-respond systems, applications and services*, USENIX Association, pp. 19-24, Berkeley (2005), and Newton et al., "The regiment macroprogramming system", *IPSN '07: Proceedings of the 6th international conference on Information processing in sensor networks*, ACM, pp. 489-498, New York (2007), both of which are incorporated by reference herein for all purposes.

According to embodiments of the present invention, the macroprogramming layer may itself be the programming foundation for the higher-level specifications of application functionality provided by the application model.

The run-time support 306 is the lowest layer in the architecture. It executes on each sensor node, providing a homogeneous interface to resources of the underlying heterogeneous hardware. The run-time layer provides resource and task management, and a set of communication primitives.

According to certain embodiments, the run-time layer may be based on the Contiki operating system for wireless sensor network devices. Embodiments of architectures according to the present invention may also function in conjunction with other WSN programming environments and middleware, such as Net-C and TinyDB. Certain embodiments may base the run-time layer on alternative operating systems, for example those that are used by other types of network embedded devices such as routers, RFID readers, vending machines etc.

The run-time layer 306 may extend the sensor OS (e.g. Contiki or another similar operating system) with dedicated services. These may include a monitoring component to measure performance and resource consumption, and may include dynamic reconfiguration facilities.

A feature of the run-time layer can be its minimal and portable runtime functionality and interface. This functionality and interface may be sufficient to support a wide range of potential applications.

A model-driven approach may be used to connect the three layers 302, 316, and 306. In the model-driven approach, an application developer specifies a high-level and network-agnostic model of the application.

Such an application model is declarative in the sense that it specifies the desired system behavior (e.g. adapt the operation of the heating system in a building based on temperature sensors), but not how this behavior is actually implemented. The application model also describes performance requirements of the system (e.g. a certain level of reliability).

The application model represents a holistic view on the complete application, including those parts that will be executed by a network embedded device, and those parts to be executed in a back-end infrastructure.

The application model is compiled into executable code and a configuration. Part of the code will execute in the WSN, and the remainder in the back-end infrastructure. Both parts of the code cooperate through appropriate communication primitives.

Figure 3B:
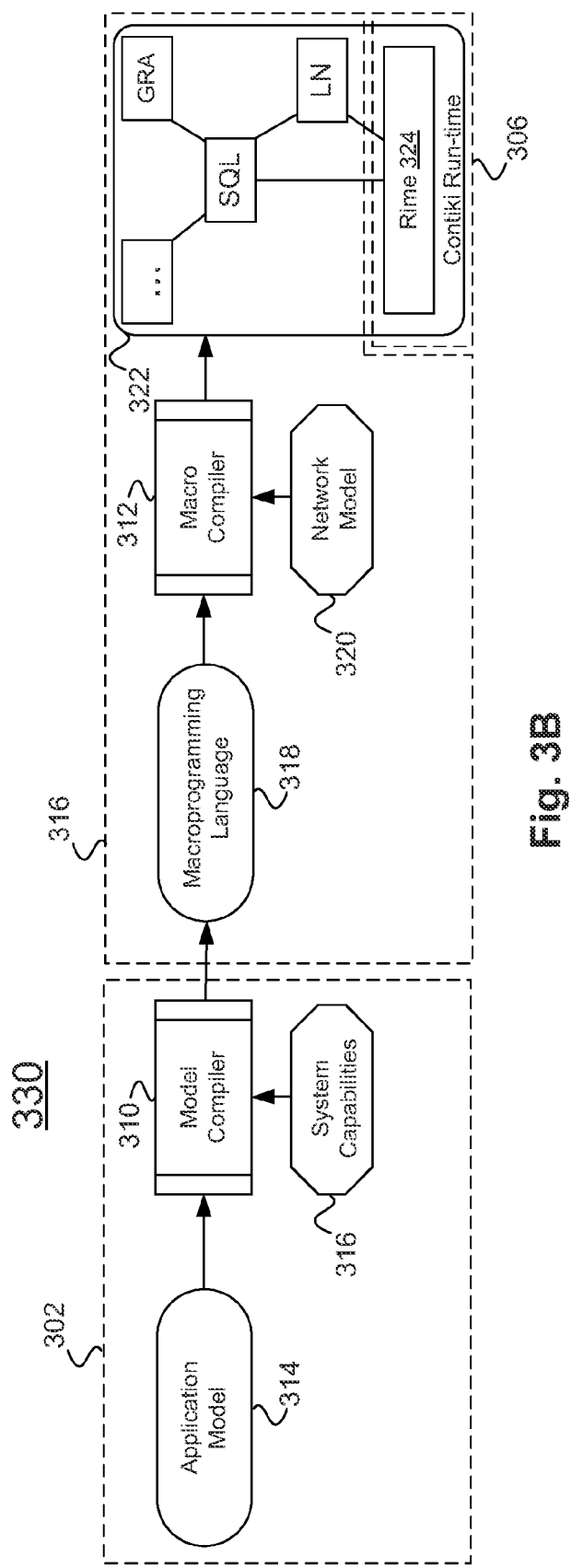
FIG. 3B depicts one embodiment of a compilation framework according to an embodiment of the architecture.

One example of an embodiment of a compilation framework 330 is shown in FIG. 3B, wherein high-level business process specifications are compiled into WSN executable code. In this embodiment, the semantic link between the layers 302, 316, and 306 is provided through two compilation steps: a model compiler 340 and a macro compiler 342.

The configuration can be updated at run-time, based on feedback from the running system. Specifically, the model compiler takes as input, the application model 302 and the system capabilities 316 that are specified in a system capability model.

The system capability model is a coarse-grained characterization of the underlying WSN, providing information such as the type of sensors and actuators available. This information assists the compiler in making sure the application functionality can be achieved.

In this embodiment, the executable code output by the model compiler makes use of the language constructs 318 provided by the macroprogramming layer 304.

The macro compiler 312 takes as input, the code generated in the previous step, and the network model 320. The network model provides finer-grained information on the deployment environment, for example describing a number of sensors of a given type that are deployed in a specific location.

The macro compiler 312 generates executable code that exploits the basic functionality provided by the run-time support 324 available on the target nodes. Moreover, by leveraging the network model, the macro compiler can generate different code for different nodes, based on their role in the application.

The macroprogramming layer may be highly modularized. The various constructs may be supported by a number of fine-grained modules. Such modules may take care of, for instance, the distributed protocols for implementing the construct semantics in an efficient, decentralized, and reliable way.

Alternative implementations may provide various possibilities in meeting business requirements. Modules best suited can be those that are actually compiled and linked into the actual application code. Run-time may also be modularized.

The dependencies between a model construct, its mapping on the macroprogramming language, its distributed modules, and the run-time modules, may be specified as part of the architecture. Together with the network model, the architecture allows the two compilers to include only modules actually needed by the application model. This reduces not only the memory footprint, but also reduces the potential for computational inefficiencies due to unnecessary features. Modularization, along with the decoupling among layers, may also be exploited to permit extension and customization of the architecture.

While the core set of features are likely to be enough to cover a wide spectrum of application domains, some domains may require (or benefit from) dedicated abstractions. These could be implemented on top of the existing abstractions provided by the macroprogramming layer, and down to the run-time layer. In some cases however, dedicated implementations may turn out to be more efficient than existing abstractions.

The compilers between the layers provide information hiding. The compilers may be instructed with mapping rules, which specify how a given construct is "wired" to the underlying modules constituting its implementation. In this manner, the compilers can accommodate the insertion of new constructs, as well as compilation against different target hardware of software platforms.

Compile-time configuration is only one way that the architecture can be tailored to the needs of business processes. Business applications may comprise dynamic entities adapting their behavior based on the context (social, business, technical, or even environmental) in which they execute.

Figure 4:
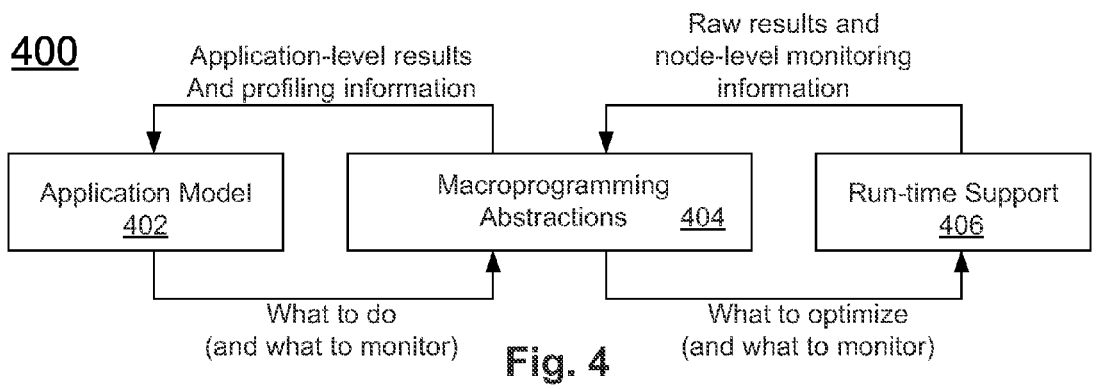
FIG. 4 depicts one example of a WSN monitoring approach according to an embodiment of the architecture.

FIG. 4 shows one example of a monitoring approach 400 that may be used in the three-level architecture of FIGS. 3A-B. This may provide business processes with the appropriate constructs that allow monitoring and control of the process behavior itself.

The activation of monitoring features can be specified through proper constructs provided at the level of the application model 402. This allows the monitoring requirements (for example a number of times a fire alarm has fired as a consequence of a sensed high temperature in a given room) to be expressed at the same level of abstraction as the behavior of the application itself. This permits application-level profiling.

Moreover, monitoring can rely on the existence of appropriate constructs and functionality (modules) in the macroprogramming layer 404 and in the runtime layer 406. High-level monitoring constructs can be compiled much like conventional constructs, therefore receiving the benefits described above.

While FIG. 4 shows raw results and node-level monitoring information as flowing back to the application model in the form of application-level results and profiling information by way of the macroprogramming abstractions, this is not required. According to other embodiments, the application model could be configured to receive raw results and node-level monitoring information directly from the network embedded devices.

One possible challenge that may be faced by embodiments of architectures according to the present invention, is the potential for low efficiency. Specifically, given the constrained resources of network embedded devices, the runtime overhead introduced should be relatively small.

Embodiments of the present invention may address this challenge in one or more ways. First, embodiments are based on model compilation rather than interpretation, since interpretation can result in a slow-down factor on one order of magnitude. The compiler(s) can use extensive resources during the offline compilation process, to produce compact and efficient executable code.

Second, embodiments of the invention may employ a domain specific modeling approach tailored to a specific class of applications, namely business applications. The compiler can thus exploit certain properties of this application class for optimization.

Third, the modeling approach, the compiler, and the run-time system may be co-designed. This allows an optimal allocation of functions between offline compilation and the runtime system to be achieved.

Figure 5:
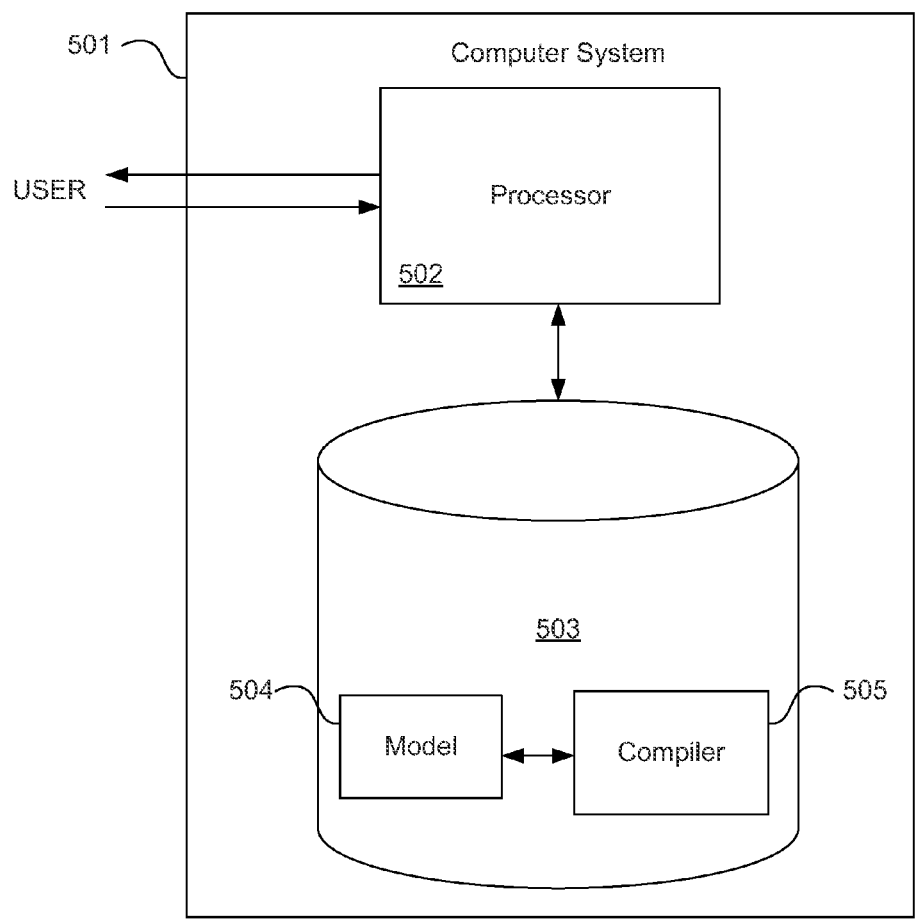
FIG. 5 shows a computer system for implementing an architecture according to one embodiment.

FIG. 5 illustrates hardware of a special purpose computing machine configured to implement an architecture according to one embodiment of the present invention. In particular, computer system 501 comprises a processor 502 that is in electronic communication with a computer-readable storage medium 503 that can comprise one or more of the various layers of the architecture, including model(s) 504 and the compiler(s) 505.

The computer system may comprise a software server. A number of software servers together may form a cluster, or logical network of computer systems programmed with software programs that communicate with each other and work together to process requests.

Figure 6:
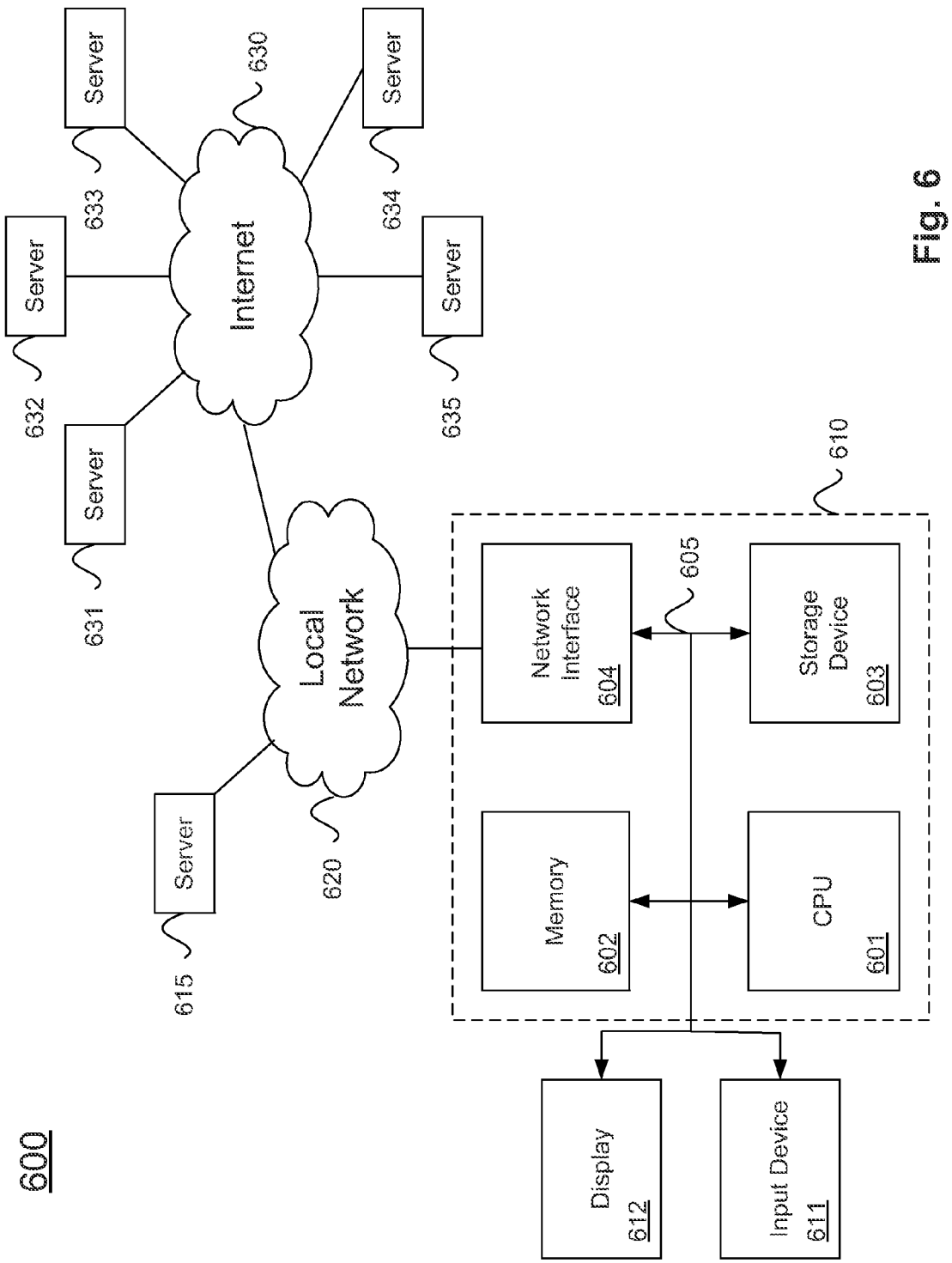
FIG. 6 illustrates hardware of a special purpose computing machine configured with according to one embodiment of the present invention.

An example computer system 610 is illustrated in FIG. 6. Computer system 610 includes a bus 605 or other communication mechanism for communicating information, and a processor 601 coupled with bus 605 for processing information.

Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both.

A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read including over the network acquired information.

Storage device 603 may include source code, binary code, or software files for performing the techniques above, for example. Storage device and memory are both examples of non-transitory computer readable storage media.

Computer system 610 may be coupled via bus 605 to a display 612, such as a cathode ray tube (CRT) or liquid crystal display (LCD), for displaying information to a computer user. An input device 511 such as a keyboard and/or mouse is coupled to bus 505 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein.

In an example involving the Internet, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

EXAMPLE

While the overall approach described above is generic, the following discussion uses a specific scenario for evaluating the techniques in a real-world application. The demonstration comprises building energy management and automation, and in particular the monitoring and optimization of ventilation systems in buildings.

Embedded systems, as part of the IT tools for managing buildings, will play a role in energy efficiency. Embedded systems may be applied in different settings, for instance, Voltage Optimization, HVAC, Lighting Automation, and Ventilation on Demand Embodiments of the present invention introduce an end-to-end solution including wireless sensors performing real-time metering of relevant environmental parameters—temperature, humidity and $CO_2$ concentration—in a highly distributed fashion throughout the building. The sensors also meter current energy consumption of the ventilation system.

Figure 7:
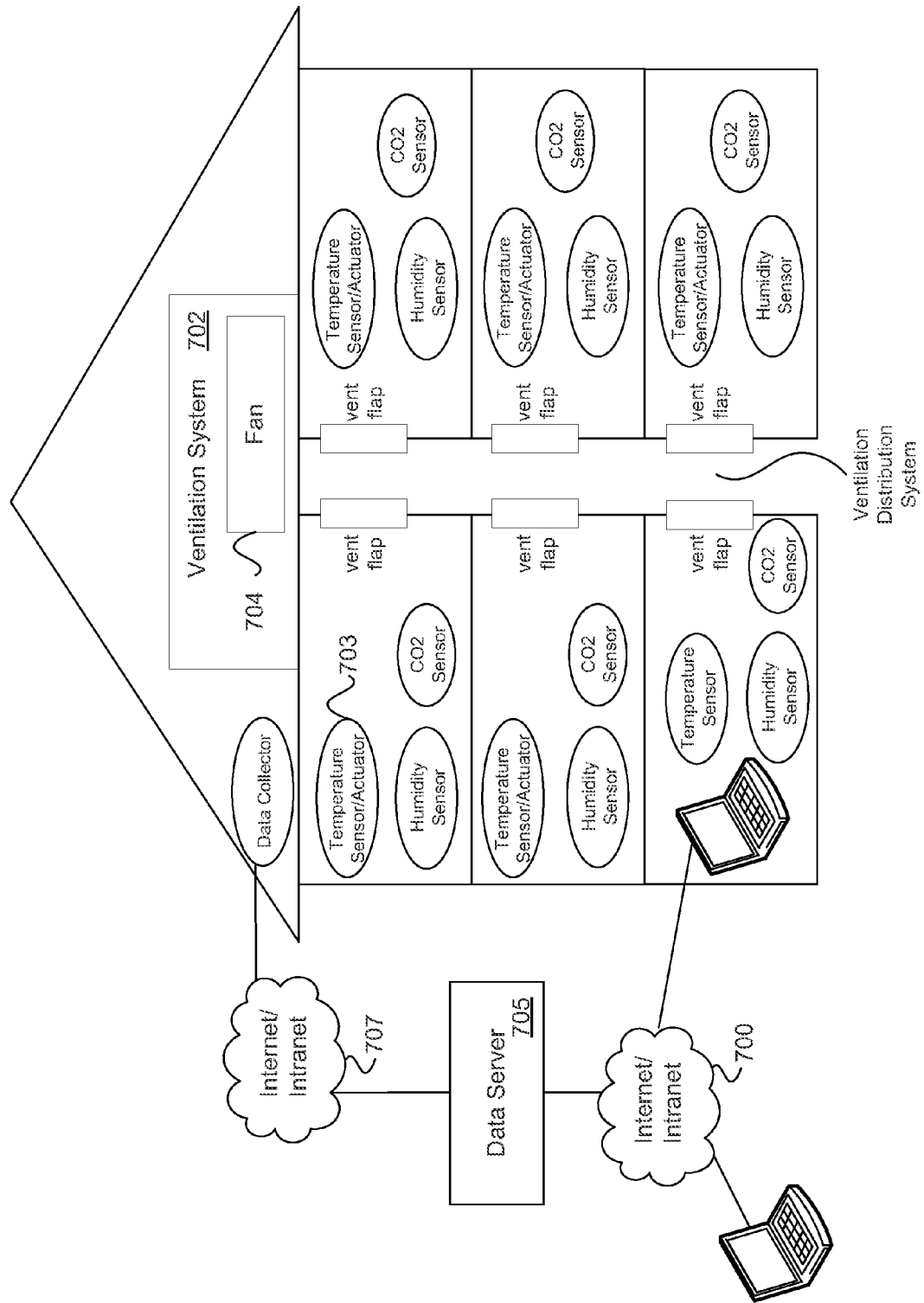
FIG. 7 depicts a simplified schematic view of an embodiment of an architecture as deployed with a WSN to monitor conditions in a building.

FIG. 7 presents a building automation scenario. The readings from sensors 703 are collected by collector 701 and routed to a data server 705 via a network such as the internet or an intranet 707. Data stored on the server 705 is accessible, for example, via a web interface 700. At the same time, the capability of automatically controlling the ventilation system 702 via wireless actuators 704 in reaction to the environmental measurements, is introduced. As a result, the user comfort is improved, and energy consumption of the ventilation system is reduced.

An interesting feature of the scenario, is that the sensors 703 are distributed throughout a multi-storey building 706 in all areas with user traffic. By contrast, the ventilation system usually is located in a somewhat remote location, for example in the attic or in the basement. Thus, the envisaged wireless network spawns a considerable geographic distance, to be bridged by the multi-hop system.

The ability to reduce energy costs offers a compelling business case in and of itself. Moreover, innovative business processes can be designed around the sensor network deployment.

One example is by performing analysis to determine preferred areas in the building that are suitable for investments in energy-saving technology. Another example is by optimally coordinating maintenance service, for example when the ventilators or vent flaps break down.

For further illustration, a specific instance of the reference scenario that controls the ventilation on a specific floor in the building, is now described. Sensor nodes deployed in the building monitor the environmental conditions inside different rooms. If some changes are detected (for example a window was open), the ventilation system can be regulated so that the minimal requirements on user comfort are satisfied while energy consumption by the ventilation system is minimized.

Moreover, in the event of a failure in the ventilation system, issues to be determined can include:
  the urgency of intervention
  a best scheduling of maintenance access so that the cost is minimized, and
  supplying service technicians with relevant information in advance.

For example, a minor failure to the ventilation system that does not affect user comfort, may not need to be addressed until a next scheduled maintenance visit.

Before a skilled domain user can model this scenario, the capabilities of the deployed sensor network (the system capability model) can first be made available to the modeling tool, as illustrated in FIG. 3B. This information describes for instance, the type and number of sensor nodes deployed in specific parts of the building. This information can be gathered semi-automatically.

Based on this knowledge, the modeling tool can restrict artifacts that the domain expert can choose from in describing the business process. For the modeling task, the user would first choose a set of sensor nodes (for example by selecting all nodes of a given type).

The user then defines a monitoring task referenced as "room state": the conditions for normal operations. An example is the acceptable level of CO2 in a room. If such a user-defined pattern has been specified once, it can easily be reused. In this case, the pattern can be reused for all rooms under consideration, or even across different buildings.

Upon violation of the conditions specified in the user defined pattern "room state", code running within the WSN will autonomously actuate the ventilation system. Simultaneously, an event is generated directed to the business process, and decisions will be taken how to react to this event. For example, a decision may be made to schedule a maintenance visit if the event was triggered by a failure in the ventilation system. How the process branches to accomplish the latter decision, can be based on data received from the sensor network, and/or data received from the business information systems.

After the decision has been taken, the task is triggered. This implies either an immediate call to a service technician, or scheduling of maintenance based on information queried from the sensor network.

Figure 8:
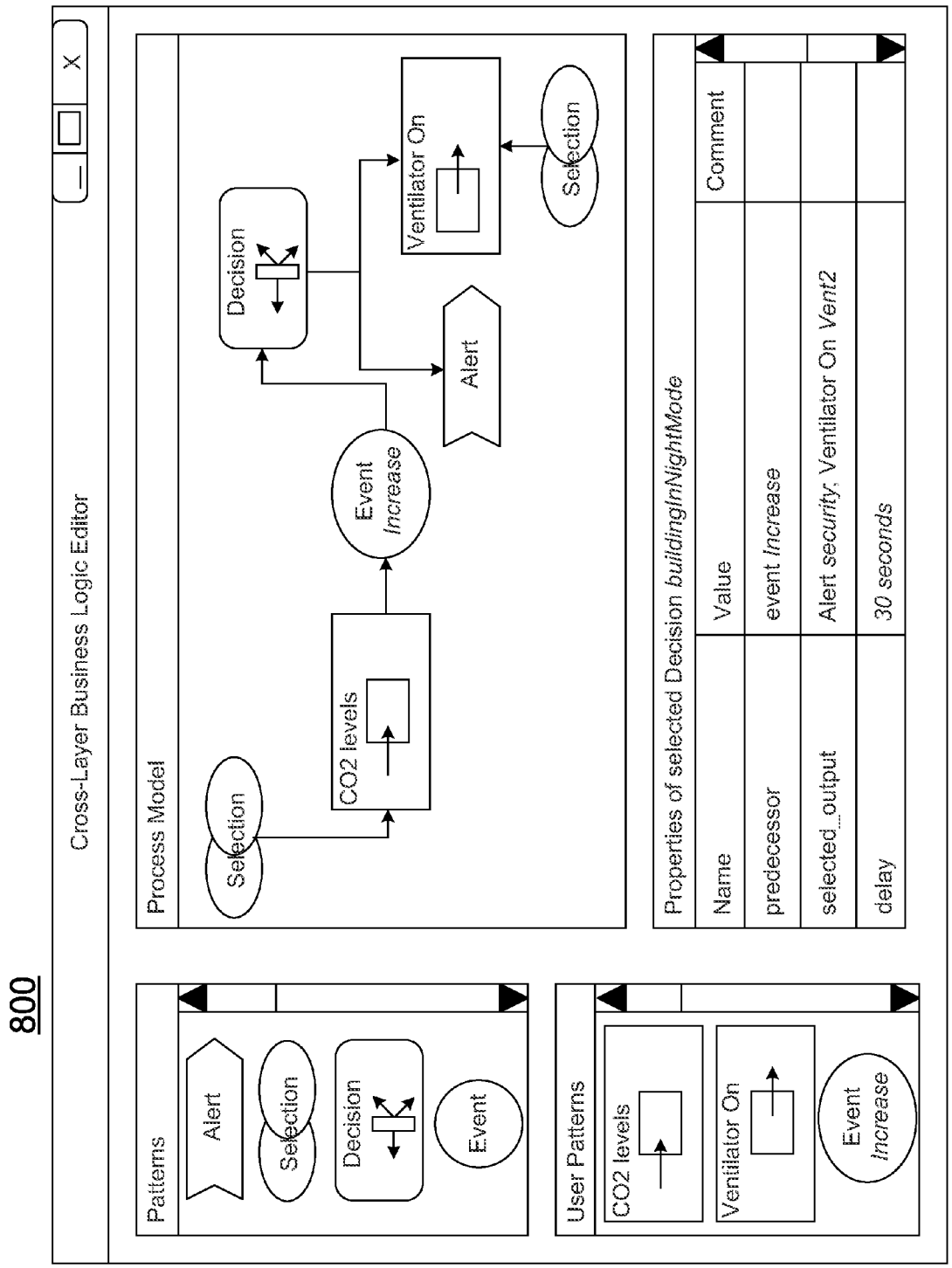
FIG. 8 depicts a user interface for the example of FIG. 7.

FIG. 8 illustrates the user interface 800 of the process modeler in this example. Parts of the application logic are hidden in the general and user defined patterns. However, FIG. 8 illustrates the manner in which a user can model processes with the architecture according to embodiments of the present invention.

The business process model is then translated to macro-code. The first step of the translation is a mapping between the artifacts that were used in the model, and the programming abstractions offered by the macroprogramming layer. This mapping can be achieved because the patterns offered to the user for modeling were chosen to fit to the abstractions.

In some cases, a pattern can be transformed in a sequence of script statements. In other cases, optimization may lead to the summary of many patterns in one script statement.

The WSN behavior can be expressed as follows. The macroprogramming layer can revolve around a small and expressive set of core abstractions. These provide basic building blocks that are glued together using a scripting language.

Programmers can extend the set of building blocks at any time. In this way, an evolvable language is provided, while still retaining the ability to customize the underlying mechanisms based on the constructs needed for a specific application. For example, in the building scenario the model compiler will leverage the abstractions of scope and role as building blocks to describe when to operate the ventilation system.

The scope identifies a subset of nodes based on their characteristics. For instance, all nodes sensing CO2 may be declared as:

```
CO2Sensors ::= Type = "sensor"
           AND Function = "CO2"
```

The notion of role can be used to assign a specific task to a given node in the sensor network. For instance, a single node in each room can be in charge of deciding to operate the ventilation system. The controller role can be assigned as:

```
controller :: = {
    count (room) {
        role == controller
    } == 0 }
``` where 'room' indicates a scope including all nodes in the same room.

The above statement requires the role of controller to be assigned to a given node when no other device is acting as such in the same room, that is when the number of nodes in the scope whose role is controller is equal to "0".

The scripting language glues together the two definitions above, in order to accomplish the desired behavior. For instance, to describe the operation of the ventilation system when a CO2 sensor detects a sudden increase in its readings, the model compiler will generate a fraction of code similar to:

```
when [CO2Sensors] report [suddenIncrease]
    tell [controller] to [operateVentilation]
``` where: suddenIncrease and operateVentilation are descriptions of data generated by CO2 sensors, and commands accepted by the nodes attached to the ventilation system, respectively.

The macro-compiler takes as input, i) the building blocks defined, ii) the script(s) describing the desired behavior, and iii) the implementation of distributed protocols and mechanisms required to realize the semantics of the employed language constructs. The macro-compiler generates working code targeted to the node-level run-time support.

The run-time layer provides a set of basic communication and scheduling primitives that the modules use to accomplish their task. The communication primitives range from a basic broadcast service that sends packets to all nearby nodes, to more complex communication mechanisms such as controlled network flooding, convergecast, and multi-hop mesh routing.

For example, to assign the controller role above, the module uses the controlled flooding primitive to send a query to all nodes within the room scope. The nodes within the scope with the controller role, use the convergecast primitive to send a reply back to the requesting node.

The requesting node collects the replies and counts the number of controller nodes within the room scope. If the number is zero the requesting node assigns itself the controller role and informs all nodes within the room of this, by sending a packet with the controlled flooding primitive.

The performance of the system depends on both the physical structure of the network, and how well the instantiation of the program executes in its environment. To improve system performance, the run-time layer collects statistics of the network environment. Based on optimization hints produced by the macro-compiler and the collected statistics, the run-time system can self-optimize the system using methods from the reinforcement learning community.

Particular embodiments according to the present invention may offer one or more benefits. One such benefit is the achievement of both unification and integration.

In particular, embodiments of the invention provide a unified, comprehensive, extensible programming framework. By design, the macro-language can be richer than existing macro-programming solutions, while providing efficient execution on WSN devices. This architecture can allow easy accommodation of unanticipated constructs and features, thereby permitting tailoring the system to application requirements.

In addition, the business back-end can be integrated by design with WSNs. A level of abstraction is raised from system- and network-centric, to business-centric development. This allows domain experts to directly realize applications involving WSN. These features will significantly streamline the adoption WSN in business processes.

Figure 1:
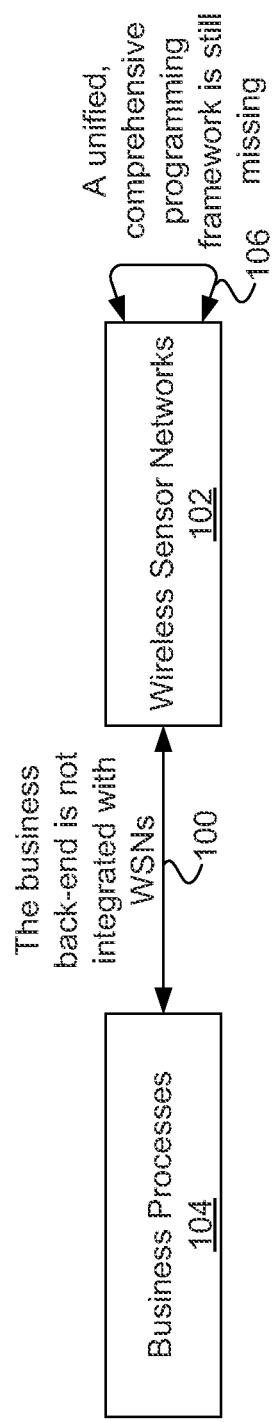
FIG. 1 is a simplified schematic view of desired integration of sensor networks with enterprise systems.

Moreover as shown in FIG. 1, the problem of unification is internal to the research field of WSNs. However, the issue of integration reaches into the domain of business processes. Therefore, embodiments of the present invention not only bring WSN to business processes, but the macroprogramming framework by itself makes a significant contribution to the field of WSN.

A goal of embodiments of the present invention is to lower the barrier for adoption of WSNs in real-world applications, notably business processes. This is valuable if WSNs are to leave the research labs and be integrated in industrial applications and to everyday life.

In achieving this goal, embodiments according to the present invention exhibit one or more of the following characteristics:
 be sufficiently expressive to specify a range of different business applications;
 be easy to use and not require any specialized training for domain-experts;
 accommodate for unanticipated requirements and needs;
 be efficient and resource-conscious, e.g. in the ability to support heterogeneous and resource-limited devices;
 assess the effectiveness of the approach in non-trivial, real-life applications;
 qualitatively and quantitatively evaluate the performance of the resulting implementations.

The architecture according to embodiments of the present invention may meet these goals on several levels. On the application model layer (providing access to domain-experts), the architecture may:
 employ flexible application modeling techniques driven by the business scenario requirements;
 employ abstractions to integrate WSNs into the business logic;
 allow profiling of relevant application-level aspects, as well as support profiling information coming from the macroprogramming layer;
 provide the compiler technology required to fill the gap from the business process layer to the macroprogramming framework.

On the macroprogramming layer, the architecture may:
 utilize programming constructs to ease the integration of WSNs into business processes, and their mutual interfaces;
 employ a coherent programming framework that is both generic and expressive, where existing and future abstractions can blend smoothly;
 allow the framework to be extended with domain specific or customized functionality;
 provide the application with profiling information, as well as driving the optimization at the run-time layer through high-level performance goals;
 use the distributed protocols required for the actual implementation of the overall programming framework;
 use compiler technology to generate the code running on the individual nodes;
 evaluate different network modeling techniques to feed compilers with information on the target deployment scenario.

On the run-time layer, the architecture may:
 support heterogeneous devices with varying capabilities (e.g. sensors and actuators);
 be able to accommodate for resource-constrained nodes without missing the opportunity to leverage richer devices if available;
 provide efficient OS-level mechanisms to exploit available resources;
 support self-optimization mechanisms driven by the high level goals percolating from the application level through the macroprogramming layer;
 define generic interfaces to mask the underlying hardware to the upper layers;
 provide run-time information to the macroprogramming layer to inform the application on the current system dynamics.

Embodiments of the present invention aim at providing an overarching programming platform and run/time architecture to simplify the implementation of applications targeting heterogeneous networks of sensors and actuators. Embodiments may be generally applied whenever control loops are to be implemented using embedded sensors and actuators.

To implement the semantics required abstractions, novel mechanisms may be designed to leverage the spontaneous cooperation among smart objects.

A mission of the architecture is to design novel programming abstractions, with well-defined semantics, that allow the dynamic instantiation of cooperating objects and services, all the way from business services to wireless sensor nodes.

In certain embodiments, the architecture can be based on a flexible run-time system built on the Contiki operating system and the Rime stack (a flexible communication stack for heterogeneous sensor networks).

Embodiments of the architecture ease the design and implementation of virtual sensors and actuators. This is because the low-level communication details necessary for their implementation will be automatically dealt with.

WSNs (and generally networked embedded devices) can be highly dynamic. This is particularly true where some of the network nodes are mobile, and therefore network topology might change frequently (nodes connecting and disconnecting from each other and from base stations, etc.).

Accordingly, the macroprogramming layer should make it possible to keep track of these modifications, and notify the enterprise layer which would use the notifications to evaluate the effect the network changes have on the existing deployed applications. Thus in certain embodiments the nodes may be managed (including network modifications) from different layers (enterprise, network etc.).

Security and privacy are also considerations where macroprogramming of WSNs is to take place at large scale. Solutions exist at different layers (e.g. WSN-node specific, enterprise-level specific etc.).

Basic security and privacy considerations can be incorporated to keep the approach as open as possible towards cross-layer solutions. The application modeling and macroprogramming approach may strengthen WSN security and privacy, as the basic security and privacy functionality could be included already within the software framework, rather than at the application layer. This would avoid repeated, error-prone implementation of security functions and protocols over and over again for individual WSN applications.

Scalability, Quality of Service (QoS), and real-time are tightly coupled with the performance of the resulting system. One challenge for macroprogramming systems is to achieve a similar level of efficiency as a hand-crafted system. This can be taken into account in multiple layers and during the compilation process. In the run-time layer, efficiency can specifically be addressed by designing mechanisms for self-optimization of the system towards specific optimization goals, such as latency or power consumption.

The architecture can be applicable to a variety of sensor network platforms. Although the above description relates to the Contiki target platform, other WSN operating platforms can benefit from the new modeling and macroprogramming functionality.

Of course the concepts and structure of embodiments of the architecture are expected to be generally applicable to networked embedded systems (such as sensor network platforms). And while an example in a specific domain is given above, by design the architecture is not restricted to that domain and target application.

Embodiments of the present invention will advance the state of the art in the area of wireless sensor networks by integrating business back ends, with wireless sensor networks. Embodiments will also provide an unified extensible programming framework that will simplify the development of non-trivial wireless sensor network applications. Hence the architecture permits other researchers to rapidly prototype and evaluate new ideas, as well as explore new application domains. In particular the development of new programming abstractions will be simplified, since these can be easily tested by integrating them into the architecture.

Moreover, the architecture according to embodiments of the present invention may make it possible to explore the interactions of new programming abstractions with existing programming abstractions. Due to the modular, layered approach offered by the architecture, other researchers can exploit new ideas at different levels. New mechanisms can be implemented on top of one or more layers.

As illustrated by the deployment scenario, the target demonstration application of the architecture is in monitoring and optimization of ventilation systems in buildings, with the aim of increased energy efficiency and reduction of GHG emissions. Such higher energy efficiency, improved ease-of-use, and simplified operation and maintenance of monitoring and control systems (all available to non-experts) could have a significant impact.

Further, the architecture allows domain experts to design innovative business processes around the deployment, simplifying monitoring and control in a new way. Ease of use, and permitting non-expert users to realize applications, are goals of the architecture.

This can have a significant impact especially for SMEs who will now be able to afford real-world interaction via WSN-empowered business processes. Up to now, such a capability only possible in big industries with many specialists on the WSN programming Reinforced excellence in systems engineering and associated modeling, wireless sensor (and actuator) networks, and cooperating objects can be realized. Embodiments of the architecture according to the present invention reinforce excellence by going beyond the state of the art in sensor networks, drastically simplifying the still tedious programming of WSNs, and therefore lowering any entry obstacles in introducing networked embedded device dependent applications.

Embodiments according to the present invention may integrate with enterprise systems through a model-driven approach, that allows non-WSN experts to express the application models in term of a business process. The deployment scenario discussed above targets networks of cooperating objects, that include heterogeneous sensors and actuators in form of the ventilation system and integrated back-end and web systems.

Embodiments of the present invention permit industry to integrate sensor networks and innovative business processes, which allows new innovative solutions to be developed rapidly, thereby reducing the time to market for products with superior functionality. Furthermore, the deployment scenario described above illustrates that ICT-enabled advantages such as optimally coordinated maintenance service, can be fully utilized.

In conclusion, Embodiments according to the present invention pose a new approach that will improve the ease of wireless sensor network programming, by allowing programmers to express high-level objectives and leave the low-level details to the compiler and run-time system. The architecture may comprise three layers: an application model layer, a macroprogramming abstraction layer, and a self-optimizing run-time system layer.

The application model layer integrates the sensor networks with business application systems by allowing WSNs to be expressed as a business application concept. The macroprogramming layer provides a network-centric programming abstraction that relieves the programmer of the details of low-level, node-centric programming The self-optimizing run-time system layer adapts to the specific conditions in the deployed sensor network by optimizing communication patterns and resource consumption based on input from the higher layers.

In an embodiment, a computer-implemented method comprises developing a declarative model of a process in terms of domains of a business software application utilizing business process management (BPM) tools, the domains based upon user defined patterns and run-time information from a network embedded device in communication with the process. A declarative model is provided as an input to a compiler to produce first executable code including a communication primitive, the first executable code and recognized by an operating system of the network embedded device, and a second executable code including the communication primitive, and recognized by the business software application. Operation of the network embedded device is controlled based upon the first executable code.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing a network model of network embedded devices;
creating a process model including an artifact restricted by a functionality indicated by the network model, wherein the functionality comprises run-time functionality;
providing the run-time functionality to the process model in the form of:
   raw results obtained from at least one of the network embedded devices and node level monitoring information,
   application results and profiling information;
providing the process model as an input to a compiler to produce:
   a plurality of abstractions of a high level device programming language, the plurality of abstractions provided to a second complier referencing the network model to produce a first executable code including a communication primitive, the first executable code recognized by an operating system of the network embedded device, and
   a second executable code including the communication primitive, the second executable code recognized by a business software application;
controlling operation of the network embedded devices based upon the first executable code;
causing a run-time support to collect statistics of a changed network environment;
causing the run-time support to self-optimize using the statistics and an optimization hint produced be the compiler, and
monitoring the operation of the network embedded devices by a construct specified in the process model and complied by the compiler to produce an application-level result.

2. The method of claim 1 wherein the network embedded devices comprise a wireless sensor network.

3. A non-transitory computer readable storage medium embodying a computer program for performing a method, said method comprising:
providing a network model of network embedded devices;
creating a process model including an artifact restricted by a functionality indicated by the network model, wherein the functionality comprises run-time functionality;
providing the run-time functionality to the process model in the form of:
   raw results obtained from at least one of the network embedded devices and node level monitoring information,
   application results and profiling information;
providing the process model as an input to a compiler to produce:
   a plurality of abstractions of a high level device programming language, the plurality of abstractions provided to a second compiler referencing the network model to produce a first executable code including a communication primitive, the first executable code recognized by an operating system of the network embedded devices, and
   a second executable code including the communication primitive, the second executable code recognized by a business software application;
controlling operation of the network embedded devices based upon the first executable code;
causing a run-time support to collect statistics of a changed network environment;
causing the run-time support to self-optimize using the statistics and an optimization hint produced by the compiler, and
monitoring the operation of the network embedded devices by a construct specified in the process model and complied by the compiler to produce an application-level result.

4. The computer readable storage medium of claim 3 wherein the network of network embedded devices comprises a wireless sensor network.

5. A computer system comprising:
one or more processors;
a software program, executable on said computer system, the software program configured to:
providing a network model of network embedded devices;
creating a process model including an artifact restricted by a functionality indicated by the network model, wherein the functionality comprises run-time functionality;
providing the run-time functionality to the process model in the form of:
   raw results obtained from at least one of the network embedded devices and node level monitoring information,
   application results and profiling information;
providing the process model as an input to a compiler to produce:
   a plurality of abstractions of a high level device programming language, the plurality of abstractions provided to a second compiler referencing the model to produce a first executable code including a communication primitive, the first executable code recognized by an operating system of the network embedded devices, and
   a second executable code including the communication primitive, the second executable code recognized by the business software application;
controlling operation of the network embedded devices based upon the first executable code;
causing a run-time support to collect statistics of a changed network environment;
causing the run-time support to self-optimize using statistics and an optimization hint produced be the compiler, and
monitoring the operation of the network embedded devices by a construct specified in the process model and complied by the compiler to produce an application-level result.

6. The computer system of claim 5 wherein the network of network embedded devices comprises a wireless sensor network.

* * * * *